US011273680B2

(12) United States Patent
Stoychev (10) Patent No.: US 11,273,680 B2
(45) Date of Patent: Mar. 15, 2022

(54) SUSPENSION SYSTEM (71) Applicant: Dana Heavy Vehicle Systems Group, LLC, Maumee, OH (US)

(72) Inventor: Stoyan I. Stoychev, Sylvania, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 68 days.

(21) Appl. No.: 16/845,124

(22) Filed: Apr. 10, 2020

(65) Prior Publication Data
US 2021/0316586 A1 Oct. 14, 2021

(51) Int. Cl.
*B60G 11/113* (2006.01)
*B60G 11/10* (2006.01)

(52) U.S. Cl.
CPC ................... *B60G 11/10* (2013.01)

(58) Field of Classification Search
CPC ..... B60B 35/163; B60B 35/003; B60B 35/00; B60B 2310/306; B60G 11/04; B60G 11/113; B60G 2200/30; B60G 2200/422; B60G 2202/112; B60G 2204/121; B60G 2204/148; B60G 2204/4306; B60G 2204/44; B60G 2206/32; B60G 2206/8101; B60G 2206/8102; B60G 2206/8207; B60G 2300/02; B60G 9/00; B60Y 2200/14; B60Y 2200/22; B60Y 2200/24
USPC .................................................. 280/124.175
See application file for complete search history.

(56) References Cited

U.S. PATENT DOCUMENTS

| 1,314,817 | A | | 9/1919 | Laycock | |
|---|---|---|---|---|---|
| 5,078,420 | A | * | 1/1992 | Jable | B60G 5/053 280/680 |
| 5,328,159 | A | * | 7/1994 | Kaufman | B60G 11/113 267/52 |
| 6,406,008 | B1 | * | 6/2002 | Dudding | B60G 9/003 267/52 |
| 6,425,595 | B1 | * | 7/2002 | Soles | B60G 11/04 267/53 |
| 7,175,190 | B2 | * | 2/2007 | Reineck | B60G 9/003 280/124.17 |
| 7,325,821 | B2 | * | 2/2008 | Myers | B60B 35/007 280/124.156 |
| 7,540,514 | B2 | | 6/2009 | Westnedge | |
| 8,029,008 | B2 | | 10/2011 | Cortez | |
| 8,540,262 | B2 | * | 9/2013 | Reiter | B60B 35/163 280/124.156 |
| 9,327,571 | B2 | | 5/2016 | Pierce | |
| 2005/0253351 | A1 | * | 11/2005 | Pan | B60G 9/003 280/124.116 |

(Continued)

FOREIGN PATENT DOCUMENTS

GB 2126539 3/1984

Primary Examiner — Toan C To
(74) Attorney, Agent, or Firm — Marshall & Melhorn, LLC (57) ABSTRACT

An axle assembly for a vehicle includes an axle beam and a suspension system. The suspension system includes a mounting member, at least one positioning member, and at least one coupling member configured to cooperate to maintain a position of a working component. The mounting member having at least one aperture formed therein is freely disposed on the axle beam and the at least one coupling member is disposed through the at least one aperture of the mounting member and entirely outside the axle beam.

19 Claims, 5 Drawing Sheets

(56) References Cited

U.S. PATENT DOCUMENTS

2015/0115565 A1* 4/2015 Kopplow .............. B60G 11/113
                                                        280/124.175
2019/0111750 A1   4/2019 Wolf-Monheim

* cited by examiner

SUSPENSION SYSTEM

FIELD

The subject matter of the embodiments described herein relates generally to a vehicle including an axle assembly and, more particularly, to a suspension system of an axle assembly for a vehicle.

BACKGROUND

A conventional vehicle includes a vehicle frame having a pair of longitudinally extending frame rails that support a vehicle power source and body. The frame is supported on a plurality of ground-engaging wheels that are disposed at opposite ends of a plurality of axles. The vehicle may contain, for example, a steer axle on which the wheels are steerable by a vehicle operator and a drive axle whose wheels are driven by the vehicle power source. Each of the axles are coupled to the vehicle frame typically employing a suspension system that dampens movements transmitted between the wheels and the vehicle frame.

Conventional suspension systems must account for lateral movement of an axle and offer a degree of lateral stability. Such suspension systems are provided to cooperate with at least one of the drive axle and the steer axle for securing a plurality of leaf springs or similar means for resiliently connecting the vehicle frame to the axle. Conventionally, the axle includes a spring seat, formed as a part of the axle beam or as an individual component, which is positioned and welded, bolted or otherwise secured to the axle beam so as to present a flat spring engaging surface.

It would be desirable to produce a suspension system that reduces a raw material mass yet increases a utilization ratio of the raw material while minimizing manufacturing complexity.

SUMMARY

In concordance and agreement with the present disclosure, a suspension system that reduces a raw material mass yet increases a utilization ratio of the raw material while minimizing manufacturing complexity, has surprisingly been discovered.

For a forged axle beam, the benefits of the presently described subject matter, include, but are not limited to a reduced x-section area at the spring seat. This x-section area defines a size of a raw material billet used for the axle beam forging overall, which allows for a reduction of raw billet weight and an increase in a billet utilization ratio (less flash). Conventional spring seats are usually made oversized to allow mounting on trucks with different distances between frame rails. However, the presently described subject matter eliminates a need for an oversized spring seat. Instead the spring seat of the presently described subject matter is a separate component which can be moved and assembled on the axle beam wherever needed as well as resulting in weight savings.

For a fabricated axle beam, the benefits of the presently described subject matter, include but are not limited to the axle beam having a constant x-section throughout its entire length, significantly reducing a manufacturing complexity. Further, the spring seat can be assembled anywhere along the axle beam, providing enhanced adjustability with no extra weight associated with elongated spring pads.

In one embodiment, an axle assembly, comprises: an axle beam; and a suspension system including a mounting member and at least one coupling member configured to cooperate with the mounting member, wherein the mounting member includes at least one aperture formed therein and is freely disposed on the axle beam and the at least one coupling member is disposed through the at least one aperture of the mounting member and entirely outside the axle beam.

As aspects of certain embodiments, the axle beam includes a seat formed therein, the seat including a substantially planar surface and at least one lip formed on an edge thereof.

As aspects of certain embodiments, further comprises a support member disposed between the mounting member and a portion of the at least one coupling member.

As aspects of certain embodiments, further comprising at least one positioning member configured to cooperate with the mounting member, wherein at least a portion of the axle beam is disposed between the at least one positioning member and the mounting member.

As aspects of certain embodiments, the mounting member, the at least one positioning member, and the at least one coupling member cooperate with each other to maintain a position of a working component disposed on the axle beam.

As aspects of certain embodiments, an end of the at least one coupling member is located below at least one of the mounting member, a seat of the axle beam, and the at least one positioning member.

As aspects of certain embodiments, the at least one positioning member includes at least one bevel formed therein.

As aspects of certain embodiments, the mounting member includes at least one wall portion having a bevel formed therein.

As aspects of certain embodiments, the bevel of the at least one wall portion cooperates with the at least one bevel of the at least one positioning member.

As aspects of certain embodiments, the at least one bevel of the at least one positioning member is configured to cooperate with the axle beam.

In another embodiment, a suspension system for a vehicle, comprises: a mounting member configured to receive a working component thereon; at least one positioning member configured to abut the mounting member; and at least one coupling member configured to cooperate with at least one of the mounting member and the at least one positioning member to maintain a position of the working component, wherein the mounting member is freely disposed on an axle beam and the at least one coupling member is disposed entirely outside the axle beam.

As aspects of certain embodiments, further comprising a support member disposed between the mounting member and a portion of the at least one coupling member.

As aspects of certain embodiments, the axle beam includes a seat formed therein, the seat including a substantially planar surface and at least one lip formed on an edge thereof.

As aspects of certain embodiments, at least a portion of the axle beam is disposed between the at least one positioning member and the mounting member.

As aspects of certain embodiments, an end of the at least one coupling member is located below at least one of the mounting member, a portion of the axle beam, and the at least one positioning member.

As aspects of certain embodiments, the at least one positioning member includes at least one bevel formed therein.

As aspects of certain embodiments, the mounting member includes at least one wall portion having a bevel formed therein.

As aspects of certain embodiments, the bevel of the at least one wall portion cooperates with the at least one bevel of the at least one positioning member.

As aspects of certain embodiments, the at least one bevel of the at least one positioning member is configured to cooperate with the axle beam.

As aspects of certain embodiments, the working component is at least one leaf spring for the vehicle.

BRIEF DESCRIPTION OF THE DRAWINGS

The above, as well as other objects and advantages of the subject matter of the embodiments described herein, will become readily apparent to those skilled in the art from a reading of the following detailed description of the embodiments when considered in the light of the accompanying drawings in which.

DETAILED DESCRIPTION

The following detailed description and appended drawings describe and illustrate various exemplary embodiments. The description and drawings serve to enable one skilled in the art to make and use the embodiments, and are not intended to limit the scope of the embodiments in any manner.

Figure 1:
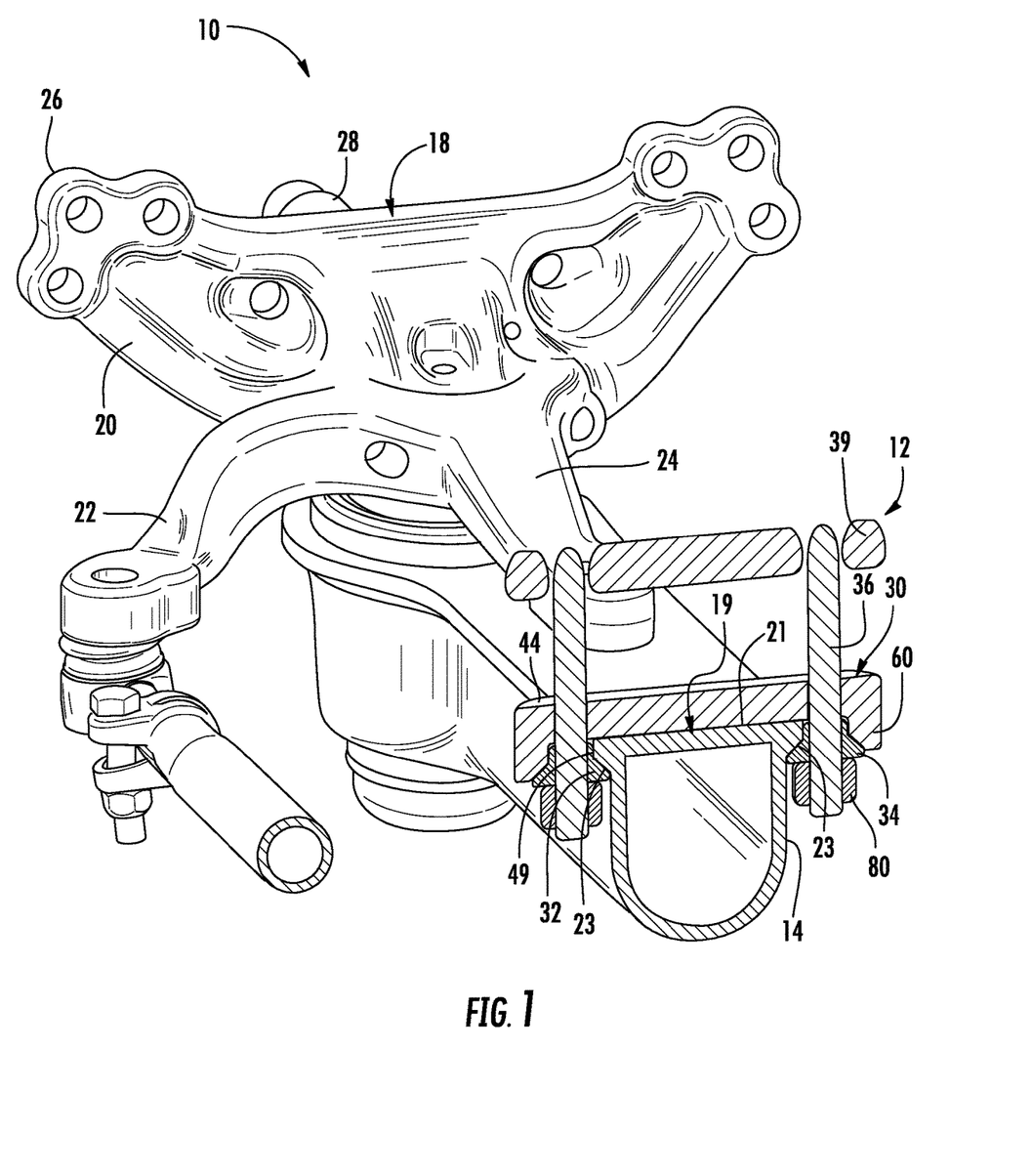
FIG. 1 is a fragmentary side perspective view, partially in section, of an axle assembly including a suspension system according to an embodiment of the subject disclosure, wherein the suspension system includes a mounting structure, at least one positioning member, a support member, and at least one coupling member, and wherein a working component is not shown.
Figure 2:
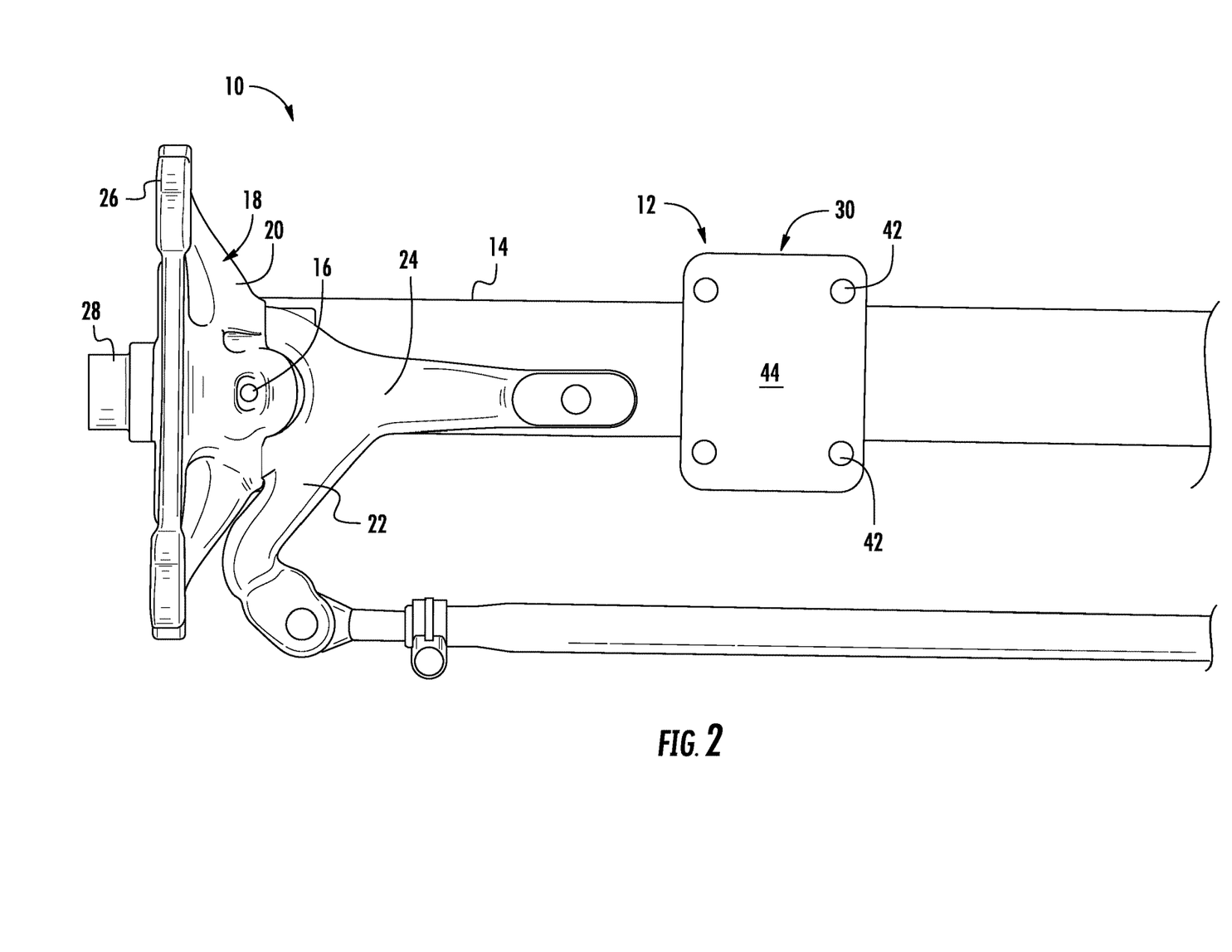
FIG. 2 is a fragmentary top plan view of the axle assembly of FIG. 1 showing only the mounting structure of the suspension system.
Figure 5:
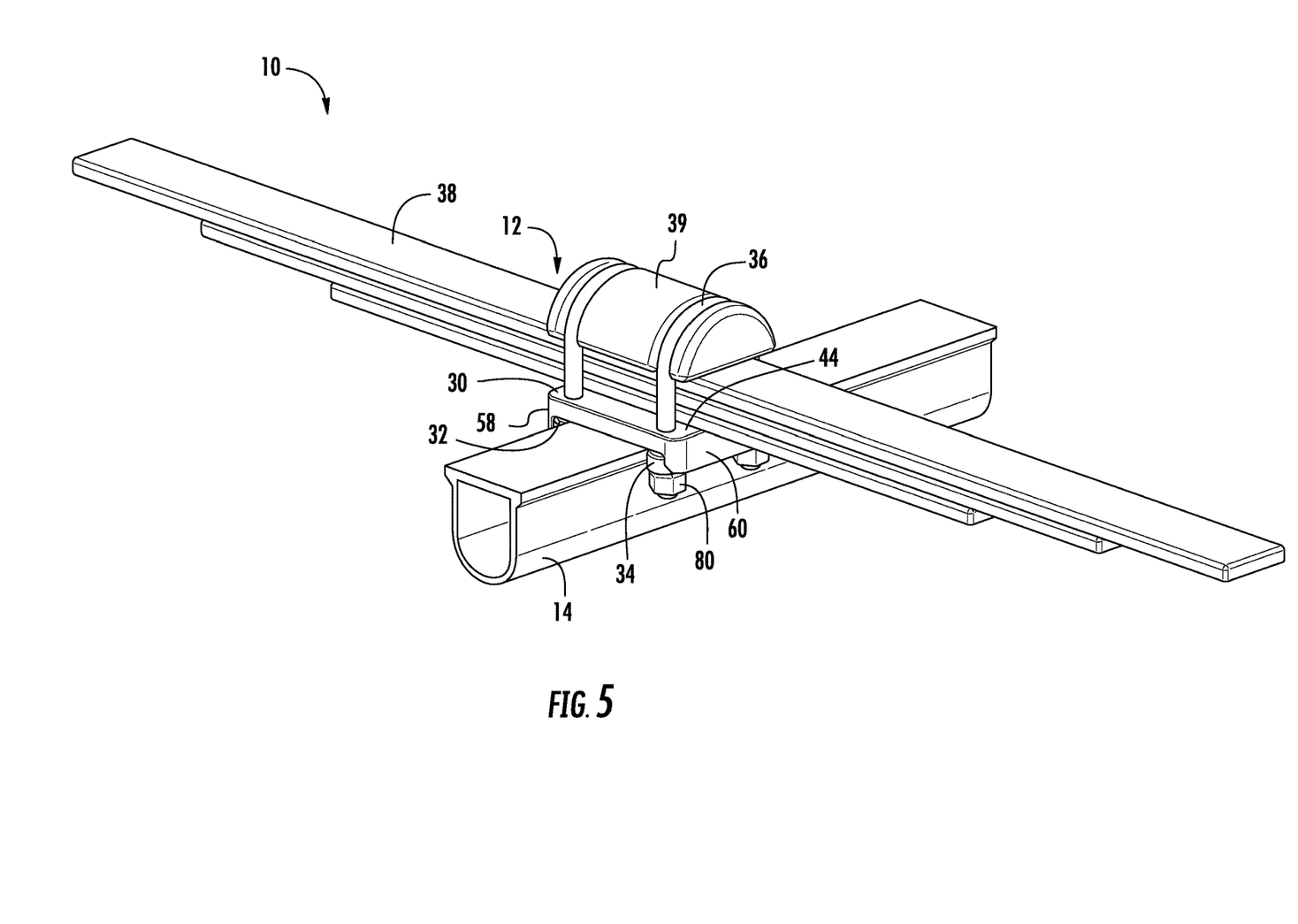
FIG. 5 is a fragmentary side perspective view of the axle assembly of FIGS. 1 and 2, wherein the working component is shown.

Referring now to the drawings wherein like reference numerals are used to identify identical components in the various views, FIGS. 1-2 and 5 illustrate a portion of a steer axle assembly 10 of a vehicle (not depicted). In certain embodiments, the steer axle assembly 10 may be configured for use with a commercial vehicle. It should be understood, however, that the presently described subject matter may find application on a wide variety of vehicles. The steer axle assembly 10 may be coupled to a frame of the vehicle by a suspension system 12 in accordance with the presently described subject matter. The frame may be provided to support an power source (not depicted), a cab (not depicted), a body (not depicted), and other components of the vehicle. The frame may be produced from any suitable material as desired such as a metal and metal alloys (i.e. steel), for example. In certain embodiments, the frame includes a pair of longitudinal rails (not depicted) extending in a direction of travel and in a longitudinal direction of the vehicle.

The steer axle assembly 10 supports one or more steerable wheels (not shown) disposed on either side of the vehicle. In certain embodiments, the steer axle assembly 10 may include an axle beam 14, kingpins 16, and steering knuckles 18. The axle beam 14 supports wheels (not shown) disposed proximate either end of the axle beam 14. Various materials made be used to produce the axle beam 14 such as a metals and metal alloys, for example. In an example, the axle beam 14 is produced from a material such as steel that may be forged or fabricated. The axle beam 14 extends transverse to the rails of the frame. A seat 19 is formed in the axle beam 14. In certain embodiments, the seat 19 may include a substantially planar upper surface 21 formed in the axle beam 14 having a lip 23 formed on each edge of the upper surface 21 of the axle beam 14. As shown, the lips 23 extend along the upper edges of the axle beam 14 substantially parallel to a longitudinal axis of the axle beam 14. Each end of the axle beam 14 may include a bore (not depicted) that extends generally vertically and substantially perpendicular to the longitudinal axis of the axle beam 14. Each bore is configured to receive a corresponding one of the kingpins 16.

The kingpins 16 are provided to couple the knuckles 18 to the axle beam 14. The kingpins 16 may be made from steel or other conventional metals and metal alloys. Each kingpin 16 may be fixed against rotation within a corresponding bore of the axle beam 14 using any suitable method as desired. It should be appreciated that the kingpins 16 may have any shape and size as desired. In certain embodiment, the kingpins 16 are generally circular.

The knuckles 18 are provided for mounting one or more wheels (not shown) of the vehicle. The knuckles 18 may be made from suitable metals such as aluminum and metal alloys such as steel and may be forged or fabricated. Each knuckle 18 may include a body 20 that defines a bore sized to receive a corresponding kingpin 16 and bearings or a bushing surrounding the kingpin 16 to allow the knuckles 18 to rotate relative to the kingpins 16. Each knuckle 18 includes a tie rod arm 22 and one of the knuckles 16 further includes a steering arm 24. Each knuckle 18 may also include a brake mounting plate 26 and a spindle 28, which may be integral with the knuckle body 20 or coupled thereto, on which wheel bearings (not depicted) and one or more wheels (not depicted) are mounted.

It should be understood that the steer axle assembly 10 described and illustrated in FIGS. 1-2 and 5 is exemplary only. The suspension system 12 claimed herein may find use on a wide variety of steer axle assemblies 10. In the steer axle assembly 10 of FIGS. 1-2 and 5, the axle beam 14 is an I-beam with a gooseneck configuration at either end. Further, each knuckle 18 includes a yoke having coaxial bores on either side of the axle beam 14 for receiving kingpins 16. The axle beam 14 may alternatively be tubular and/or relatively straight while each of knuckles 18 define a single knuckle boss.

Referring back to FIG. 1, the suspension system 12 in accordance with one embodiment of the presently described subject matter. The suspension system 12 may be used to couple the steer axle assembly 10 to the frame. The suspension system 12 may include a mounting member 30, a pair of positioning members 32, 34, a plurality of coupling members 36, and a support member 39. In certain embodiments, the suspension system 12 may further include at least one working component 38 such as a spring or shock absorber, for example. In certain embodiments, the at least one working component 38 is provided to dampen movements between the steer axle assembly 10 and the frame.

The mounting member 30 in cooperation with the positioning members 32 may provide lateral stability to the suspension system 12. The mounting member 30 may be made from any suitable material such as a metal or plastic material, for example. In one embodiment, the mounting member 30 may be generally rectangular extending a greater distance in the longitudinal direction of the vehicle, frame, and rails of frame than it does in a longitudinal direction of the axle beam 14 and in a traverse or vertical direction. In certain other embodiments, the mounting member 30 may be substantially square in transverse cross-section.

Figure 3:
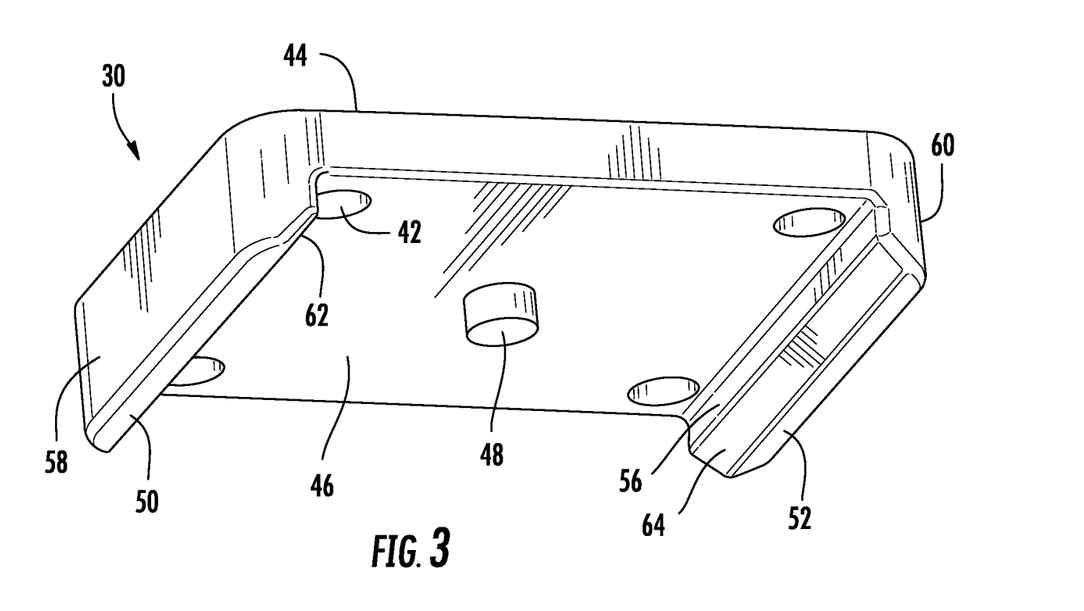
FIG. 3 is a bottom perspective view of the mounting structure of the suspension system shown in FIGS. 1 and 2.

As shown in FIG. 3, the mounting member 30 includes a main body having a pair of opposing substantially planar first and second surfaces 44, 46. A plurality of apertures 42 is formed in the main body extending from the first surface 44 to the second surface 46. Each aperture 42 may be configured and have any size and shape to receive a corresponding one of the coupling members 36 therein. The first surface 44 may be configured to receive the base 40 of the working component 38 thereon. The second surface 46 may include at least one protuberance 48 extending outwardly therefrom. The at least one protuberance 48 may be received into a corresponding aperture (not depicted) formed in the axle beam 14 to facilitate positioning of the suspension system 12 at a desired location.

In certain embodiments, the mounting member 30 is freely received onto the axle beam 14. It should be appreciated, however, that the mounting member 30 may be fixedly coupled to the axle beam 14 by any suitable method such as by any mechanical (i.e. welding, employing fasteners, etc.) or chemical (i.e. epoxy) method, for example. Opposing peripheral edges of the main body that are substantially parallel in respect to the longitudinal axis of the axle beam 14 each have a respective wall portion 50, 52 extending downwardly from the second surface 46. Inner surfaces 54, 56 of the wall portions 50, 52, respectively, substantially face each other and are substantially parallel to outer surfaces 58, 60 of the wall portions 50, 52. In certain embodiments, each of the inner surfaces 54, 56 has a respective bevel 62, 64 formed therein formed to extend outwardly from the inner surfaces 54, 56 to the outer surfaces 58, 60.

Figure 4:
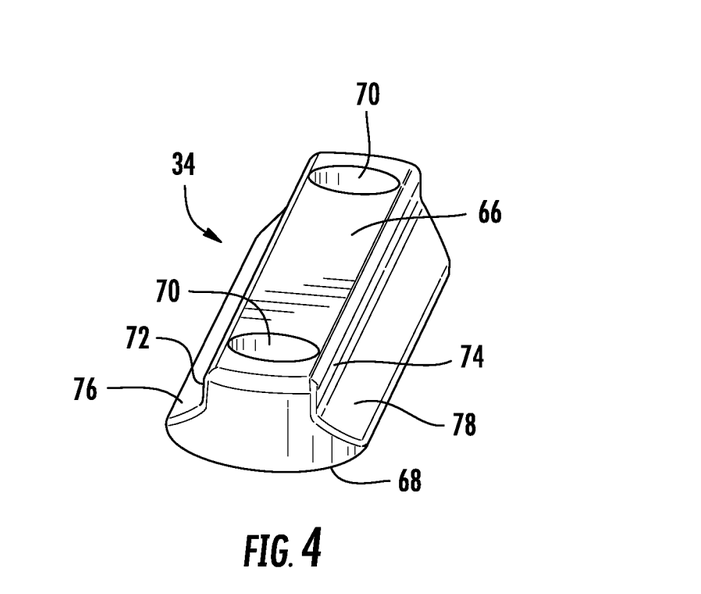
FIG. 4 is a side perspective view of the at least one positioning member of the suspension system shown in FIGS. 1 and 2.

When the mounting member 30 is positioned on the seat 19 of the axle beam 14, a space 49 is formed between the lips 23 of the axle beam 14 and each of the inner surfaces 54, 56 of the wall portions 50, 52 of the mounting member 30. In certain embodiments, the spaces 49 are sized to permit the coupling members 36 to extend therethrough and receive at least a portion of one of the positioning members 34 at least partially therein. As illustrated in FIG. 4, the positioning members 34 each include a main body having opposing first and second surfaces 66, 68. The surfaces 66, 68 may be substantially planar. It should be understood, however, that at least one of the surfaces 66, 68 may be substantially arcuate or irregularly shaped if desired. A plurality of apertures 70 is formed in the main body extending from the first surface 66 to the second surface 68. Each aperture 70 may be configured and have any size and shape to receive a corresponding one of the coupling members 36 therein.

In certain embodiments, the positioning members 34 are freely received into the spaces 49. It should be appreciated, however, that the positioning members 34 may be fixedly coupled to the axle beam 14 or the mounting member 30 by any suitable method such as by any mechanical (i.e. welding, employing fasteners, etc.) or chemical (i.e. epoxy) method, for example. Outer surfaces 72, 74 of the main body of the positioning members 34 are formed to be substantially parallel to inner surfaces 54, 56 of the wall portions 50, 52. In certain embodiments, each of the outer surfaces 72, 74 has first and second bevels 76, 78 formed to extend outwardly from the inner surfaces 54, 56 to the outer surfaces 58, 60. The first bevel 76 is configured to cooperate with the seat 19 formed on the axle beam 14. In certain embodiments, the first bevel 76 is configured to cooperate with the lips 23 of the seat 19 on the axle beam 14. Similarly, the second bevel 78 is configured to cooperate with the bevels 62, 64 and the inner surfaces 54, 56 of the wall portions 50, 52 of the mounting structure 30. It is understood that the mounting member 30, the positioning members 32, and the axle beam 14 may be sized differently or have different shapes so long as they are complementary to one another.

As more clearly shown in FIG. 5, the coupling members 36 may be U-bolts. It should be appreciated, however, that any suitable coupling members may be employed as the coupling members 36 as desired. The coupling members 36 are configured to cooperate with the support member 39. The support member 39 may include one or more grooves formed therein. The grooves extend substantially parallel to the longitudinal direction of axle beam 14 and each groove is configured to receive a portion of one of the coupling members 36. In certain embodiments, the support member 39 includes two grooves. It should be understood, however, that the number of grooves may vary. Each end of the coupling members 36 is received through the apertures 42, 70 formed in the mounting member 30 and the positioning members 32, 34, respectively, and secured thereto using fastening elements 80.

To assemble the suspension system 12 of the steer axle assembly 10, the mounting member 30 is placed onto the axle beam 14 such that the mounting member 30 is freely disposed onto the seat 19 of the axle beam 14. Thereafter, the positioning members 32, 34 are disposed in the spaces 49 formed between the lips 23 of the axle beam 14 and the inner surfaces 54, 56 of the wall portions 50, 52 of the mounting member 30 securing the seat 19 of the axle beam 14 therebetween. In certain embodiments, the lips 23 of the seat 19 are disposed between the mounting member 30 and the respective one of the positioning members 32, 34. When the positioning members 32, 34 are placed, the bevels 76, 78 of the positioning members 32, 34 abut respective one of the lips 23 of the seat 19 and the bevels 62, 64 of the mounting member 30. Additionally, the apertures 42 of the mounting member 30 are in alignment with the apertures 70 of the positioning members 32, 34. Thereafter, the working component 38 is placed onto the axle beam 14. The working component 38 is disposed on the mounting member 30 and then the support member 39 is disposed on the working component 38. Thereafter, the coupling members 36 are disposed in the grooves of the support member 39 extending through the aligned apertures 42, 70 of the members 30, 32, 34. The fastening element 80 is disposed on each end of the coupling members 36 to secure and maintain a position of the working component 38 onto the axle beam 14.

Figure 6:
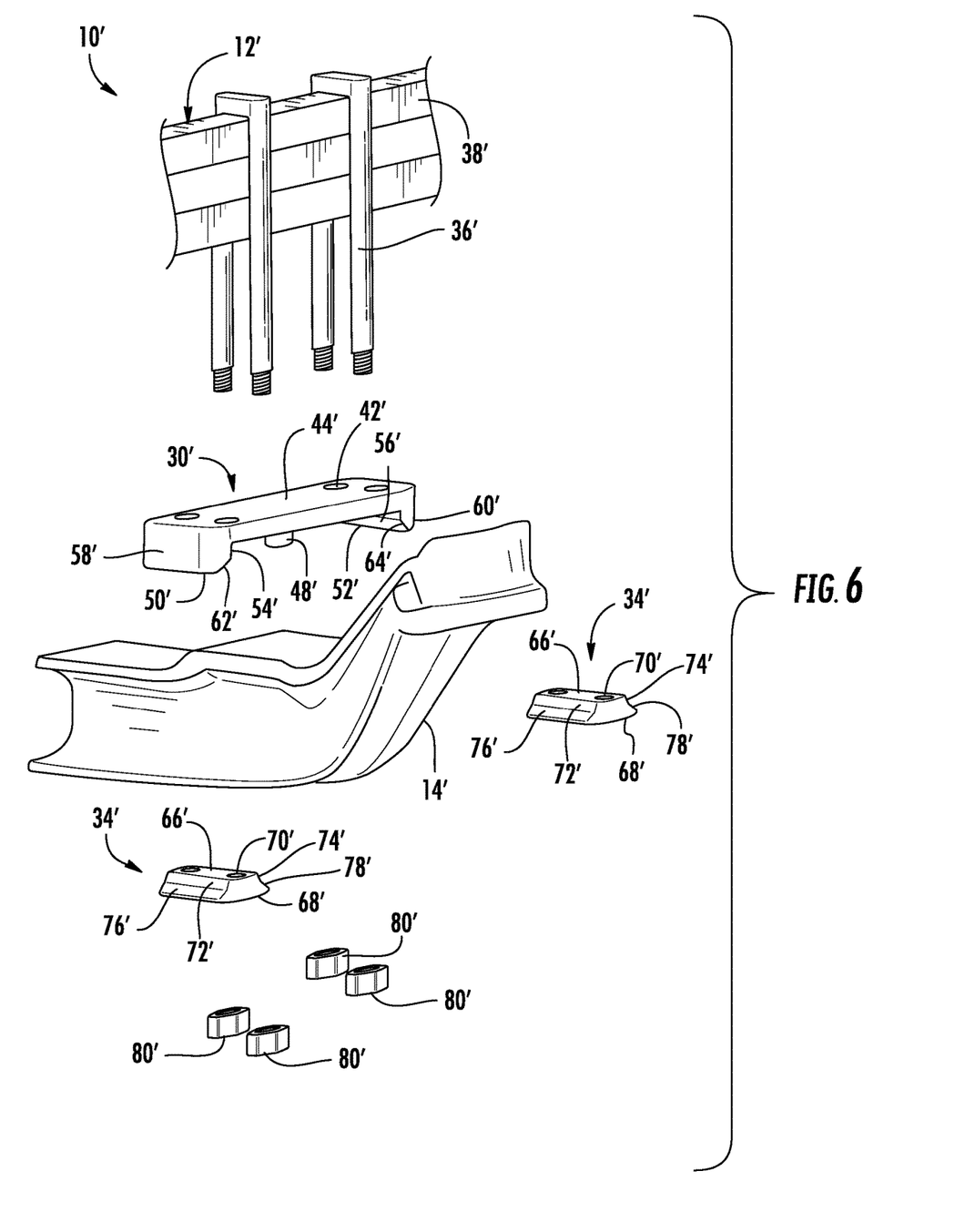
FIG. 6 is a partially exploded fragmentary side perspective view of an axle assembly including a suspension system according to another embodiment of the subject disclosure.

Referring now to FIG. 6, a steer axle assembly 10' in accordance with another embodiment will be described. Reference numerals for similar structure in respect of the description of FIGS. 1-5 are repeated in FIG. 6 with a prime (') symbol. Accordingly, the detailed description of an axle beam 14', a mounting structure 30', and positioning members 32', 34' is as described hereinabove and not repeated hereinafter.

The suspension system 12' claimed herein may find use on a wide variety of steer axle assemblies 10'. In the steer axle assembly 10' of FIG. 6, the axle beam 14' may be any suitable beam as desired such as a forged beam, a fabricated beam, an !-beam with a gooseneck configuration at either end, and the like, for example. The suspension system 12' may be used to couple the steer axle assembly 10' to the frame. The suspension system 12' may include a mounting member 30', a pair of positioning members 32', 34', and a plurality of coupling members 36'. In certain embodiments, the suspension system 12' may further include at least one working component 38' such as a spring or shock absorber, for example. In certain embodiments, the at least one working component 38' is provided to dampen movements between the steer axle assembly 10' and the frame.

As illustrated, the coupling members 36' may be U-bolts. It should be appreciated, however, that any suitable coupling members may be employed as the coupling members 36' as desired. The coupling members 36' are configured to cooperate with the working component 38'. Each end of the coupling members 36' is received through apertures formed in the mounting member 30' and the positioning members 32', 34' and secured thereto using fastening elements 80'.

To assemble the suspension system 12' of the steer axle assembly 10', the mounting member 30' is placed onto the axle beam 14' such that the mounting member 30' is freely disposed onto the seat 19' of the axle beam 14'. Thereafter, the positioning members 32', 34' are disposed in the spaces 49' formed between the lips 23' of the axle beam 14' and the inner surfaces 54', 56' of the wall portions 50', 52' of the mounting member 30' securing the seat 19' of the axle beam 14' therebetween. In certain embodiments, the lips 23' of the seat 19' are disposed between the mounting member 30' and the respective one of the positioning members 32', 34'. When the positioning members 32', 34' are placed, the bevels 76', 78' of the positioning members 32', 34' abut respective one of the lips 23' of the seat 19' and the bevels 62', 64' of the mounting member 30'. Additionally, the apertures 42' of the mounting member 30' are in alignment with the apertures 70' of the positioning members 32', 34'. Thereafter, the working component 38' is placed onto the axle beam 14'. The working component 38' is disposed on the mounting member 30'. Thereafter, the coupling members 36' are disposed over the working component 38' extending through the aligned apertures 42', 70' of the members 30', 32', 34'. A fastening element 80' is disposed on each end of the coupling members 36' to secure and maintain a position of the working component 38' onto the axle beam 14'.

In other embodiments (not depicted), the respective working component 38, 38' of the steer axle assembly 10, 10' may include a base configured to be received onto the seat 19, 19' of the axle beam 14, 14'. The base may include coupling members integrally formed thereon and extending outwardly therefrom.

To assemble the suspension system 12, 12' of the steer axle assembly 10, 10' of such embodiment, the mounting member 30, 30' is placed onto the axle beam 14, 14' such that the mounting member 30, 30' is freely disposed onto the seat 19, 19' of the axle beam 14, 14'. Thereafter, the positioning members 32, 34, 32', 34' are disposed in the spaces 49, 49' formed between the lips 23, 23' of the axle beam 14, 14' and the inner surfaces 54, 56, 54', 56' of the wall portions 50, 52, 50', 52' of the mounting member 30, 30' securing the seat 19, 19' of the axle beam 14, 14' therebetween. The lips 23, 23' of the seat 19, 19' are disposed between the mounting member 30, 30' and the respective one of the positioning members 32, 34, 32', 34'. When the positioning members 32, 34, 32', 34' are placed, the bevels 76, 78, 76', 78' of the positioning members 32, 34, 32', 34' abut respective one of the lips 23, 23' of the seat 19, 19' and the bevels 62, 64, 62', 64' of the mounting member 30, 30'. Additionally, the apertures 42, 42' of the mounting member 30, 30' are in alignment with the apertures 70, 70' of the positioning members 32, 34, 32', 34'. Thereafter, the working component 38, 38' is placed onto the axle beam 14, 14'. The base of the working component 38, 38' is disposed on the mounting member 30, 30' having the coupling members extending through the aligned apertures 42, 70, 42', 70' of the members 30, 32, 34, 30', 32', 34'. The fastening element 80, 80' is disposed on each end of the coupling members to secure and maintain a position of the working component 38, 38' onto the axle beam 14, 14'.

From the foregoing description, one ordinarily skilled in the art can easily ascertain the essential characteristics of the subject matter of the embodiments described herein and, without departing from the spirit and scope thereof, can make various changes and modifications to the embodiments to adapt them to various usages and conditions.

What is claimed is:

1. An axle assembly, comprising:
   an axle beam; and
   a suspension system including a mounting member, at least one positioning member configured to cooperate with the mounting member, and at least one coupling member configured to cooperate with the mounting member, wherein the mounting member includes at least one aperture formed therein and is freely disposed on the axle beam and the at least one coupling member is disposed through the at least one aperture of the mounting member and entirely outside the axle beam, and wherein at least a portion of the axle beam is disposed between the at least one positioning member and the mounting member.

2. The axle assembly of claim 1, wherein the axle beam includes a seat formed therein, the seat including a substantially planar surface and at least one lip formed on an edge thereof.

3. The axle assembly of claim 1, further comprising a support member disposed between the mounting member and a portion of the at least one coupling member.

4. The axle assembly of claim 1, wherein the mounting member, the at least one positioning member, and the at least one coupling member cooperate with each other to maintain a position of a working component disposed on the axle beam.

5. The axle assembly of claim 1, wherein an end of the at least one coupling member is located below at least one of the mounting member, a seat of the axle beam, and the at least one positioning member.

6. The axle assembly of claim 1, wherein the at least one positioning member includes at least one bevel formed therein.

7. The axle assembly of claim 6, wherein the mounting member includes at least one wall portion having a bevel formed therein.

8. The axle assembly of claim 7, wherein the bevel of the at least one wall portion cooperates with the at least one bevel of the at least one positioning member.

9. The axle assembly of claim 6, wherein the at least one bevel of the at least one positioning member is configured to cooperate with the axle beam.

10. A suspension system for a vehicle, comprising:
    a mounting member configured to receive a working component thereon;

at least one positioning member configured to abut the mounting member; and at least one coupling member configured to cooperate with at least one of the mounting member and the at least one positioning member to maintain a position of the working component, wherein the mounting member is freely disposed on an axle beam and the at least one coupling member is disposed entirely outside the axle beam.

11. The suspension system of claim 10, further comprising a support member disposed between the mounting member and a portion of the at least one coupling member.

12. The suspension system of claim 10, wherein the axle beam includes a seat formed therein, the seat including a substantially planar surface and at least one lip formed on an edge thereof.

13. The suspension system of claim 10, wherein at least a portion of the axle beam is disposed between the at least one positioning member and the mounting member.

14. The suspension system of claim 10, wherein an end of the at least one coupling member is located below at least one of the mounting member, a portion of the axle beam, and the at least one positioning member.

15. The suspension system of claim 10, wherein the at least one positioning member includes at least one bevel formed therein.

16. The suspension system of claim 15, wherein the mounting member includes at least one wall portion having a bevel formed therein.

17. The suspension system of claim 16, wherein the bevel of the at least one wall portion cooperates with the at least one bevel of the at least one positioning member.

18. The suspension system of claim 15, wherein the at least one bevel of the at least one positioning member is configured to cooperate with the axle beam.

19. The suspension system of claim 10, wherein the working component is at least one leaf spring for the vehicle.

* * * * *